(No Model.)

T. R. RYAN.
STRAINING MACHINE.

No. 277,789. Patented May 15, 1883.

Attest:
Charles Pickles
Wm. J. Sayers

Inventor:
Thos. R. Ryan
By Knight Bros
Attys.

UNITED STATES PATENT OFFICE.

THOMAS R. RYAN, OF ST. LOUIS, MISSOURI.

STRAINING-MACHINE.

SPECIFICATION forming part of Letters Patent No. 277,789, dated May 15, 1883.

Application filed October 30, 1882. (No model.)

*To all whom it may concern:*

Be it known that I, THOMAS R. RYAN, of the city of St. Louis, in the State of Missouri, have invented a certain new and useful Improvement in Straining-Machines, of which the following is a full, clear, and exact description, reference being had to the accompanying drawings, forming part of this specification, and in which—

Figure 1:
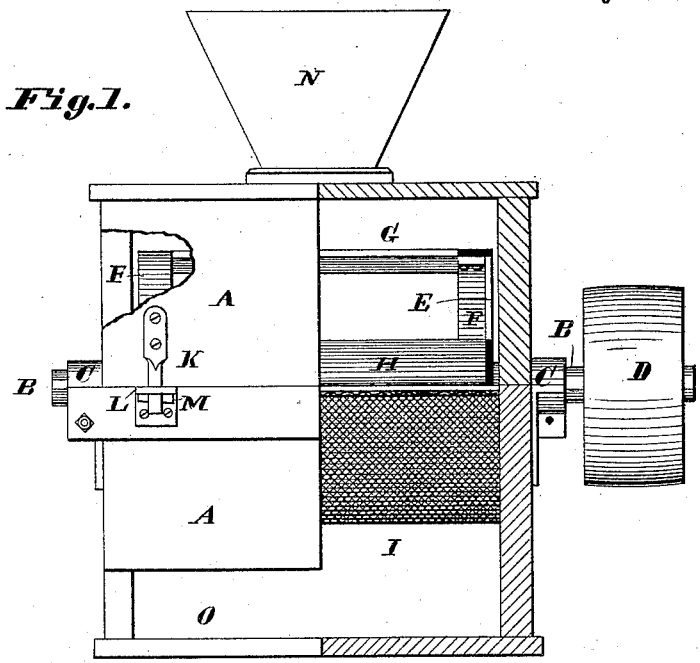
Figure 2:
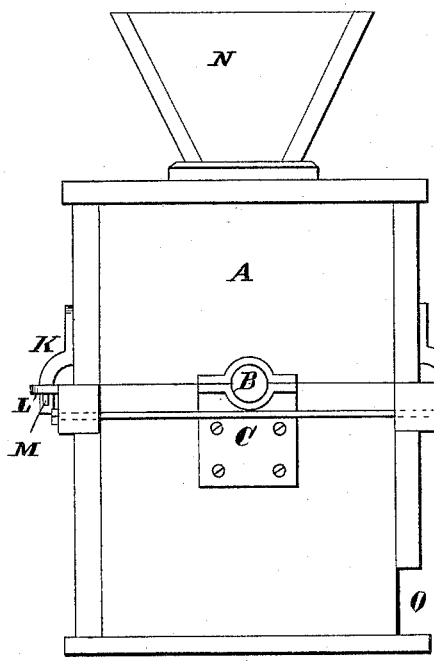
Figure 3:
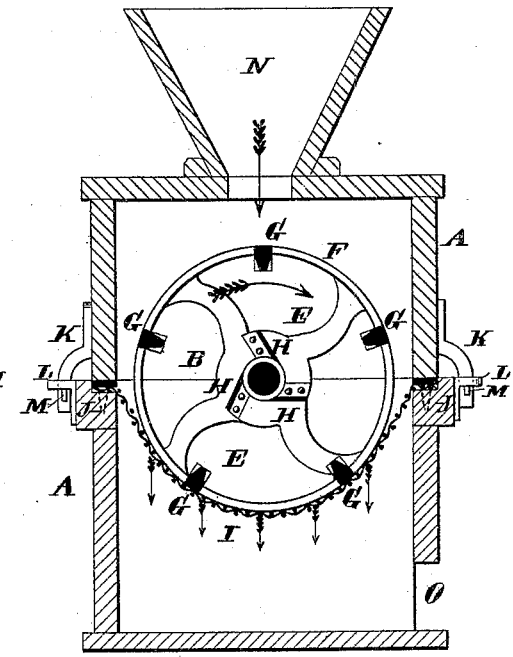

Figure 1 is a front view, part in section. Fig. 2 is an end view, and Fig. 3 is a vertical transverse section.

My invention relates to a machine or apparatus for straining cooked fruits for making preserves, jellies, &c.; and my invention consists in the construction of the apparatus hereinafter fully described and claimed.

Referring to the drawings, A represents a suitable box or case. Through the center of the box passes a shaft, B, journaled in suitable boxes, C, secured to the outside of the box, as shown. Upon one end of the shaft is a driving-pulley, D, and upon each end of the shaft, within the case, is secured a spider, E, a ring, F, being secured to the outer ends of the arms in each case. These rings are connected by a suitable number—I have shown five—of horizontal scraper-bars, G. The hubs of the spiders are connected by horizontal radial bars or plates H, their position vertically being shown fully in Fig. 3. Beneath this open cylinder is a strainer, I, consisting of wire-gauze or a sheet of perforated metal—preferably the former—which is shown secured to the sides of the box or case by tacks J, or in any suitable way. The case A is made preferably in two sections or parts, the lower part supporting the cylinder, the upper part being removable to allow access to the cylinder and strainer for the purpose of cleaning them, &c. I have shown the two parts secured together by arms K on the upper part passing down through slots in angle-brackets L on the lower part. Transverse keys M hold the arms in the brackets.

N is a hopper on top of the box, through which the material enters the machine.

The operation is as follows: Power being applied, the cylinder is revolved at the desired rate of speed. The material is then fed through the hopper, as shown by the arrow, and, falling upon the inclined plates H, is thrown with considerable force upon the strainer, and that part of it which is too coarse or lumpy to pass through the strainer is scraped and mashed by the bars G. The matter passing through the strainer is removed through an opening, O, in the bottom of one of the walls.

I claim as my invention—

The shaft B, spiders E, rings F, secured to outer ends of the spiders, horizontal scraper-bars G, connecting the rings, and horizontal radial plates H, connecting the hubs of the spiders, in combination with a case, A, having suitable strainer, I, as set forth.

THOMAS R. RYAN.

Witnesses:
 SAML. KNIGHT,
 GEO. H. KNIGHT.